May 6, 1958 E. GUNDERT ET AL 2,833,947

ELECTRON BEAM DEFLECTING SYSTEM

Filed Oct. 20, 1953 5 Sheets-Sheet 1

Inventors
EBERHARD GUNDERT
WERNER KLUGE
BY:
Michael S. Striker
ATTORNEY

Inventors
EBERHARD GUNDERT
WERNER KLUGE
By
Michael S. Striker
ATTORNEY

Inventors
EBERHARD GUNDERT
WERNER KLUGE
By Michael S. Striker
ATTORNEY

Inventors
EBERHARD GUNDERT
WERNER KLUGE
By Michael S. Striker
ATTORNEY

Inventors
EBERHARD GUNDERT
WERNER KLUGE
By
Michael S. Striker
ATTORNEY 2,833,947

ELECTRON BEAM DEFLECTING SYSTEM

Eberhard Gundert and Werner Kluge, Ulm (Danube), Germany, assignors to Telefunken Gesellschaft für Drahtlose Telegraphie m. b. H., Hannover, Germany Application October 20, 1953, Serial No. 387,122
Claims priority, application Germany October 28, 1952
5 Claims. (Cl. 313—78)

The present invention relates mainly to electron beam sysems, and more particularly to electrostatic deflection systems for cathode ray tubes.

It is generally known that cathode ray tubes employing electrostatic deflection systems may be operated with balanced as well as unbalanced deflection circuits. It is furthermore known that pattern distortions, of the type known as trapezoidal and pin-cushion distortion, appear in cathode ray tubes employing electrostatic deflection systems.

If a cathode ray tube, employing an electrostatic deflection system, is operated with balanced deflection circuits no trapezoidal distortion will be noted. The circuit arrangement is however simplified if unbalanced deflection circuits are employed and therefore such arrangements are preferred. In unbalanced deflection circuits one of the deflection plates adjacent the screen of the cathode ray tube is connected to the anode thereof, while the other deflection plate has the deflecting or control voltage connected thereto.

Various techniques for overcoming and eliminating trapezoidal distortion resulting from the use of unbalanced deflecting circuits are known. One known technique is to construct the pair of deflection plates adjacent the screen of the cathode ray tube asymmetrically, by for instance, making the deflection plate, to which the deflection voltage is connected, U-shaped. In this manner trapezoidal distortion is avoided when using unbalanced deflection circuits for cathode ray tubes using electrostatic deflection systems.

Although trapezoidal distortion is eliminated, as noted, by the U-shaped construction of one of the deflection plates adjacent the screen when using unbalanced deflection circuits, it has been noted that trapezoidal distortion will again arise when such construction is used with balanced deflection circuits.

Pin-cushion distortion results because the electron beam in its undeflected state passes between a pair of deflecting plates, located near the image screen, in a shorter time than when said electron beam is deflected by means of the deflection plates located near the cathode end of the cathode ray tube. As a result the deflection sensitivity of the deflection plates adjacent the screen is greater for the deflected than for the undeflected beam.

Various techniques for decreasing or neutralizing pin cushion distortion are known. These techniques have the disadvantage, however, that while serving to reduce pin cushion distortion, they tend to increase trapezoidal distortion. The known techniques for decreasing or neutralizing pin cushion distortion are objectionable.

At the present time in order to overcome the aforementioned distortions, it has been necessary to use special tube types, one of which is used with balanced, and the other of which is used only with unbalanced deflection circuits.

It is an object of this invention to overcome the need for resorting to different tube types when it is desired to use either balanced or unbalanced electrostatic deflecting systems. In accordance with the present invention it is possible to construct a cathode ray tube using electrostatic deflecting systems which may be used for either balanced or unbalanced electrostatic deflection without introducing trapezoidal or pin-cushion distortion.

The invention is based on the realization that aforementioned distortions may be reduced if the deflecting plates adjacent the image screen end of the tube are so constructed that the electron beam in every position of its deflection, produced by the deflecting plates near the cathode end of the tube, is exposed while passing through the deflecting plates adjacent the screen to a uniform electrostatic field. At the same time, the image screen should be so constructed that the electron beam upon leaving the deflecting plates located at the image screen end of the tube covers the same distance to the screen.

The beneficial results of the invention are realized by providing the deflecting plates located adjacent the image screen end of the tube with arcuate edges extending substantially transversely to the principal axis of the tube in the form of arcs whose centers of curvature are located in a center line passing through the principal axis perpendicular thereto and to the plane of deflection of the deflecting plates adjacent the cathode end of the cathode ray tube. Ideally the center line should also pass through the mid deflection point of the deflecting plates adjacent the cathode end of the tube. In order to completely eliminate trapezoidal and pin-cushion distortion the image screen should likewise have its center of curvature located substantially at the mid deflection point.

From the above discussion it will be apparent that the primary object of the present invention is to provide a cathode ray tube employing electrostatic deflection systems and which may be used with balanced as well as unbalanced electrostatic deflection.

It is another object of this invention to substantially reduce image distortion prevalent in present day cathode ray tubes employing electrostatic deflection systems.

It is yet another object of the present invention to provide a cathode ray tube whose image screen may be spherical, slightly spherical or even non-spherical without danger of introducing excessive trapezoidal or pincushion distortion.

An embodiment of the present invention involves an electron beam deflecting system for cathode ray tubes embodying means for emitting an electron beam along a principal axis comprising first electron beam deflecting means for deflecting an emitted electron beam in a predetermined plane of deflection; second electron beam deflecting means including a pair of deflecting plates located in direction of the principal axis after and spaced from the first electron beam deflecting means on opposite sides of the principal axis, the deflecting plates having arcuate edges extending substantially transversely to the principal axis in the form of arcs whose centers of curvature are located in a center line passing through the principal axis perpendicular thereto and to the predetermined plane of deflection.

Another embodiment of the present invention involves an electron beam deflecting system for cathode ray tubes embodying means for emitting an electron beam along a principal axis comprising, first electron beam deflecting means for deflecting an emitted electron beam in a predetermined plane of deflection, and second electron beam deflecting means including a pair of deflecting plates located in direction of the principal axis after and spaced from the first electron beam deflecting means on opposite sides of the principal axis, said deflecting plates having arcuate entrance edges extending substantially transversely to the principal axis in the form of arcs whose centers of curvature are located in a first line passing through a first point of the principal axis perpendicular thereto and to the predetermined plane of deflection and having exit edges extending substantially transversely to said principal axis in the form of arcs whose centers of curvature are located in a second center line passing through said principal axis parallel to the first center line and at a second point of said principal axis located between the first point of said principal axis and the deflecting plates.

Yet another embodiment of the present invention involves an electron beam deflecting system for cathode ray tubes comprising means for emitting an electron beam along a principal axis, first electron beam deflecting means for deflecting the emitted electron beam, the deflecting means having a mid deflection point located in the principal axis from which the electron beam is deflected in a predetermined plane of deflection, second electron beam deflecting means including a pair of deflecting plates located in direction of the principal axis after and spaced from the first electron beam deflecting means on opposite sides of the principal axis, the deflecting plates having entrance and exit edges extending substantially transversely to the principal axis in the form of arcs whose centers of curvature are located in a center line passing through the mid deflection point perpendicular to the principal axis and to the predetermined plane of deflection, an image screen having a spherical face whose center of curvature is located substantially in the mid deflection point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
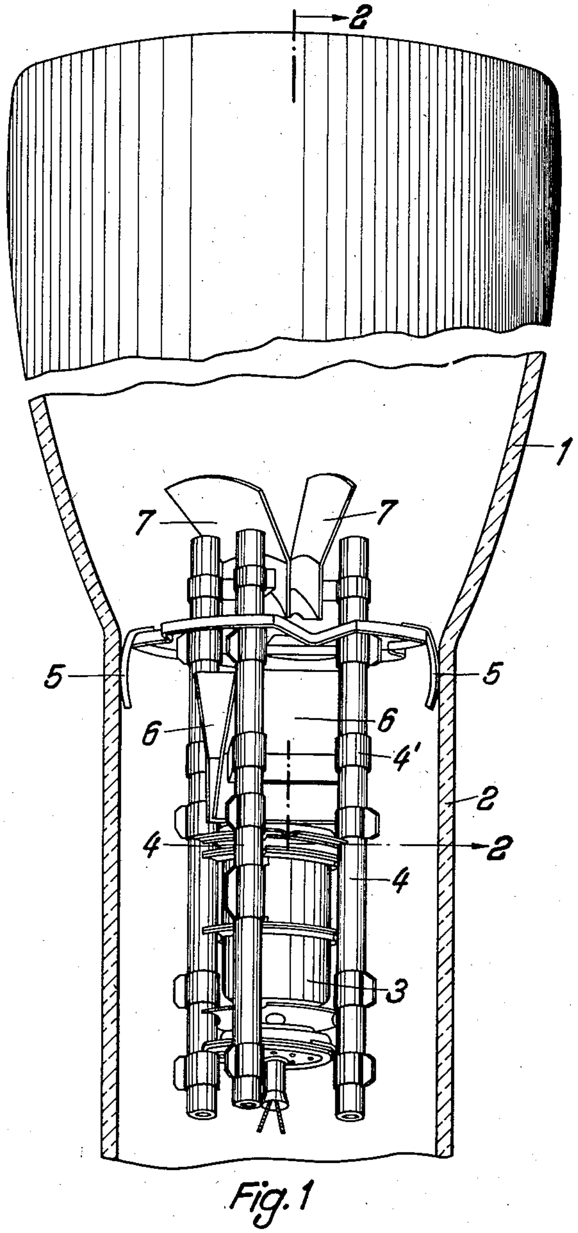
Fig. 1 is a perspective view of a part of a cathode ray tube using deflecting plates in accordance with the present invention.

Referring to Fig. 1, a vacuum envelope 1 is illustrated, in which there is arranged an electron gun 3 and an electrostatic deflection system. The electrodes of the electron gun 3, as well as the deflecting plates adjacent the cathode and screen ends of the cathode ray tube, respectively, are secured by means of clamps 4' to the insulating rods 4. The electron gun 3 and deflecting plates 6 and 7 are united to form a single assembly which is inserted into the neck portion 2 of the vacuum envelope and supported therein by means of bracing springs 5. The deflecting plates 6 and 7 are arranged in 90° relation to each other so that one pair of plates will deflect the electron beam horizontally, while the other pair of plates serve to deflect the beam in vertical direction. The shape of the pair of deflecting plates 7 is illustrated in Fig. 1. Due to the particular shape of these plates trapezoidal and pin-cushion distortion is substantially eliminated.

Figure 2:
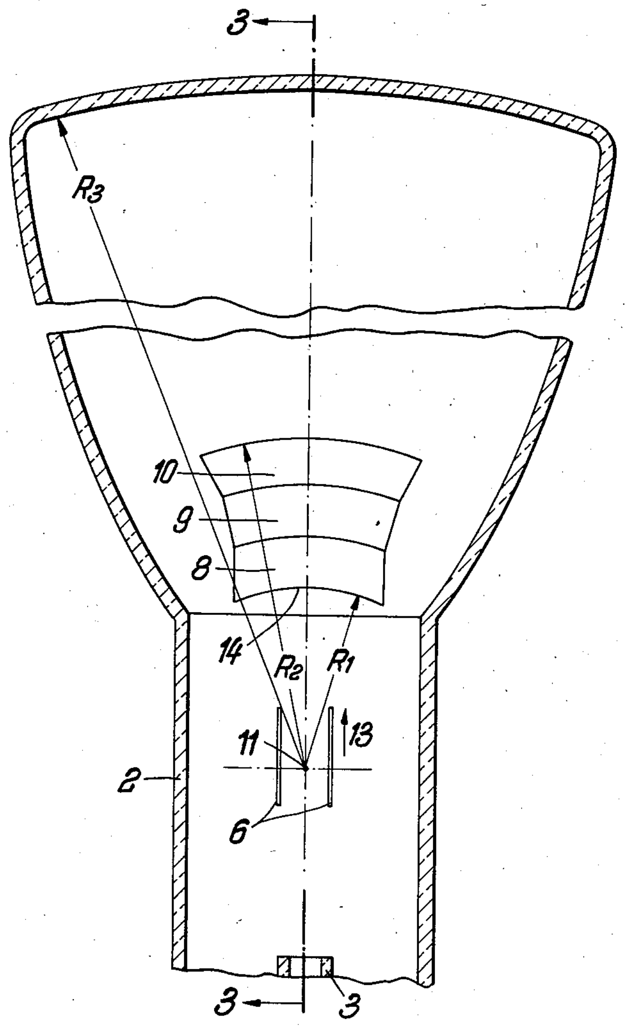
Fig. 2 is a vertical section of Fig. 1, shown schematically, and taken along lines 2—2 in the direction of the arrows.
Figure 3:
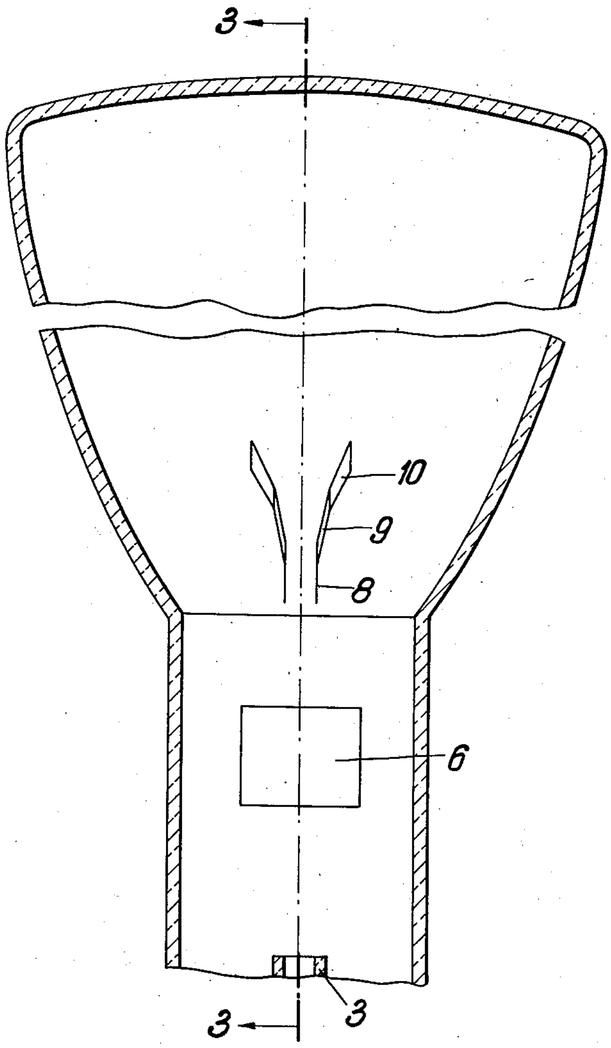
Fig. 3 is a vertical section of Fig. 2 taken along lines 3—3 in the direction of the arrows.

Figs. 2 and 3 illustrate the pair of deflecting plates 7 as consisting of three individual sections 8, 9 and 10 which diverge in the direction of the screen 14. By diverging the deflecting plates adjacent the screen end of the tube the deflection sensitivity can be increased since the electron beam may be kept close to the plates without actually hitting the plates.

In accordance with the invention the deflecting plates 7 have arcuate exit and entrance edges **14, 14*a* respectively, extending substantially transversely to the principal axis 13 in the form of arcs whose centers of curvature are located in a center line passing through the principal axis 13 perpendicular thereto and to the plane of deflection of the deflecting plates 6. The center line in this case should preferably pass through the mid deflection point 11 of the deflecting plates 6. As may be noted in Fig. 2 the beam entrance edge 14 is generated by a radius $R_1$ whereas the beam exit edge 14*a* is generated by a radius $R_2$. The image screen in this case has a spherical face whose center of curvature is located substantially in the mid deflection point 11 and whose radius is denoted by $R_3$. Sections 9 and 10 are parts of cones having a common axis located in the center line passing through the principal axis 13. The deflecting plates 7** can also be made as a single continuous section instead of the three sections illustrated in Figs. 2 and 3.

If the image screen is constructed as illustrated in Fig. 2, neither trapezoidal nor pin-cushion distortion can result. As a rule because of the effort to obtain better image reproduction, a plane image screen or an image screen with a slight curvature is preferred. However by using a plane or slightly curved screen pin-cushion distortion will again appear.

Figure 4:
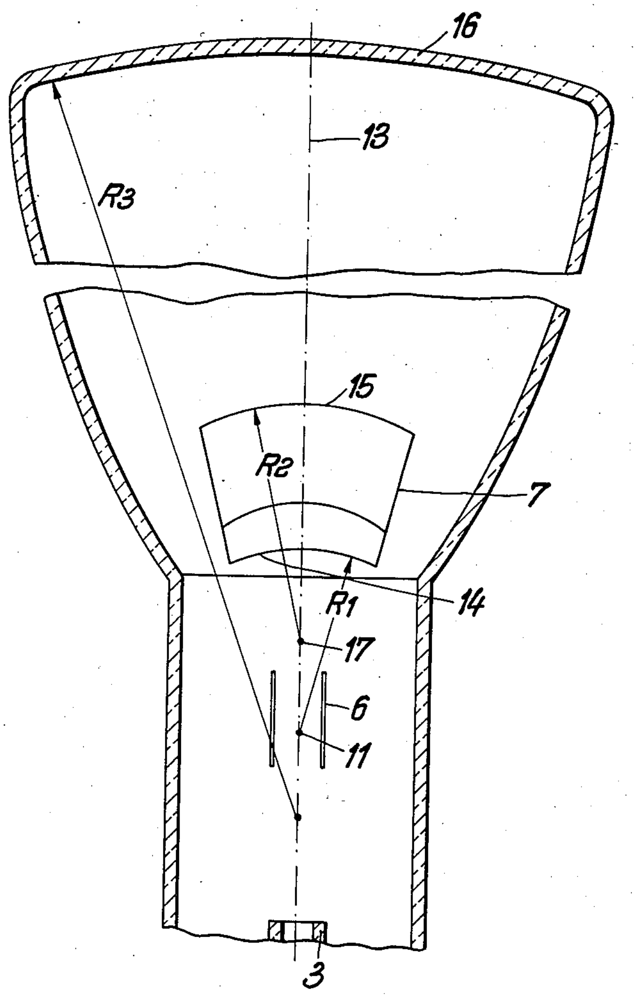
Fig. 4 is a vertical section similar to Fig. 2 and serves to illustrate a modification of the present invention.

Fig. 4 illustrates a modification of the present invention wherein pin-cushion distortion arising from the use of a plane or a slightly curved image screen may be neutralized. The neutralization of pin-cushion distortion is effected by displacing the center of curvature of exit edge 15 and also of exit edges of the parts 8 and 9, if the deflecting plates 7 consist of three individual sections as illustrated in Fig. 2 toward the image screen 16. In this embodiment the center of curvature of the arcuate entrance edge 14 remains in the same center line passing through the mid-deflection point 11 as in the case of the embodiment illustrated in Figs. 2 and 3. This center line will henceforth be referred to as the first center line. The center of curvature of the arcuate beam exit edge 15 will lie in a 2nd center line 17 which is parallel to the first center line and perpendicular to the principal axis.

Since the image screen 16 in this case is but slightly curved its center of curvature will be located in a point on the principal axis farther from the image screen than the mid-deflection point 11. By displacing the center of curvature of the arcuate exit edge 15 from its position illustrated in Fig. 2 to the position illustrated in Fig. 4, the electron beam in its undeflected condition will be confined between the deflecting plates 7 for a greater distance than in its deflected condition, which deflection is produced by a pair of deflecting plates 6.

$R_1$, $R_2$, and $R_3$ illustrate respectively the radii of the arcuate beam entrance edge 14, the arcuate beam entrance edge 15, and the spherical face of the image screen 16. In this embodiment the deflecting plate 17 is illustrated as being constituted of a single continuous section.

Figure 5:
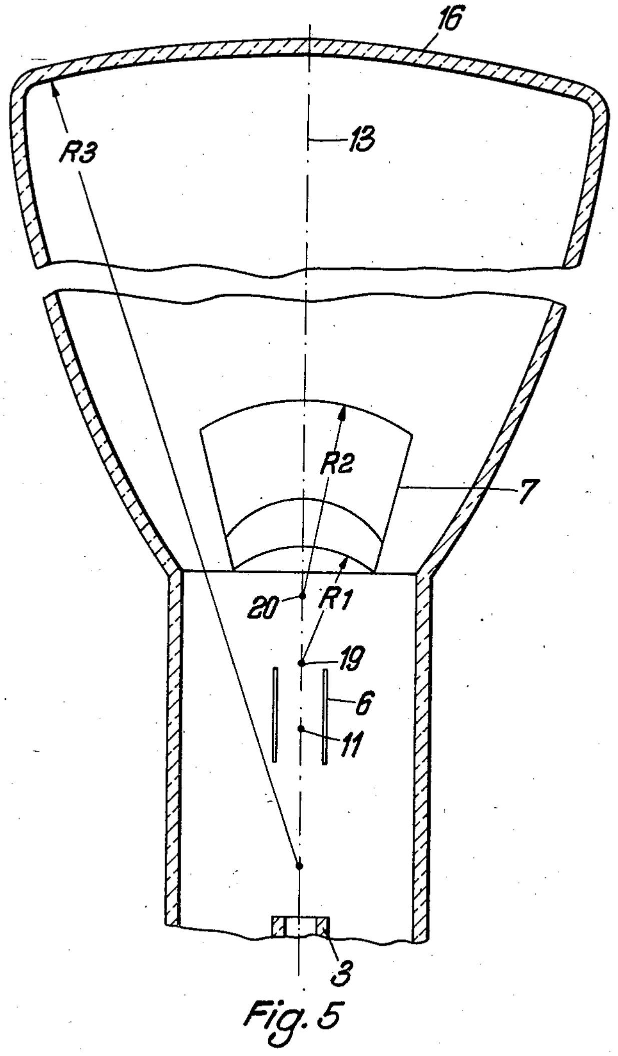
Fig. 5 is a vertical section similar to Figs. 2 and 4 and illustrates yet another modification of the present invention.

In order to neutralize trapezoidal distortion which results because of a slight deviation from the rotational symmetry of the plates 7, for instance because of the omission of a screen normally located between the image screen and the pair of deflection plates adjacent the screen end of the cathode ray tube, it has been discovered that if the beam entrance edge illustrated in Fig. 5 as well as the beam exit edge have their centers of curvature respectively displaced toward the image screen, that this trapezoidal distortion may be substantially reduced. As clearly indicated in Fig. 5 the arcuate beam entrance edge has a radius $R_1$ and a center of curvature which is located in a first center line 19 and an arcuate exit edge which has a radius $R_2$ and a center of curvature located in a second center line 20, the first and second lines being parallel to each other and perpendicular to the principal axis 13. The image screen is illustrated as having a radius $R_3$. By means of this modification it is possible to eliminate trapezoidal and pin-cushion distortion for cathode ray tubes which are not completely rotationally symmetrically constructed.

It will be understood that each of the elements described above, or two or more together, may also find a useful application in other types of electron beam deflecting systems differing from the types described above.

While the invention has been illustrated and described as embodied in cathode ray tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electron beam deflecting system for cathode ray tubes embodying means for emitting an electron beam along a principal axis, in combination, first electron beam deflecting means for deflecting an emitted electron beam in a predetermined plane of deflection; and second electron beam deflecting means including a pair of deflecting plates located in direction of the principal axis after and spaced from said first electron beam deflecting means on opposite sides of said principal axis, said deflecting plates having entrance edges extending substantially transversely to said principal axis in the form of arcs whose centers of curvature are located in a first center line passing through a first point of said principal axis perpendicular thereto and to said predetermined plane of deflection and having arcuate exit edges extending substantially transversely to said principal axis in the form of arcs whose centers of curvature are located in a second center line passing through said principal axis parallel to said first center line and at a second point of said principal axis located between said first point of said principal axis and said deflecting plates.

2. In an electron beam deflecting system for cathode ray tubes embodying means for emitting an electron beam along a principal axis, in combination, first electron beam deflecting means for deflecting an emitted electron beam, said deflecting means having a mid-deflection point located in the principal axis from which said electron beam is deflected in a predetermined plane of deflection; and second electron beam deflecting means including a pair of deflecting plates located in direction of the principal axis after and spaced from said first electron beam deflecting means on opposite sides of said principal axis, said deflecting plates having arcuate entrance edges extending substantially transversely to said principal axis in the form of arc whose centers of curvature are located in a first center line passing through said mid-deflection point perpendicular to said principal axis and to said predetermined plane of deflection and having arcuate exit edges extending substantially transversely to said principal axis in the form of arcs whose center of curvature are located in a second center line passing through said principal axis parallel to said first center line and at a point of said principal axis located between said mid-deflection point on said principal axis and said deflecting plates.

3. In a cathode ray tube in combination, means for emitting an electron beam along a principal axis; first electron beam deflecting means for deflecting said emitted electron beam in a predetermined plane of deflection; second electron beam deflecting means including a pair of deflecting plates located in direction of the principal axis after and spaced from said first electron beam deflecting means on opposite sides of said principal axis, said deflecting plates having entrance edges extending substantially transversely to said principal axis in the form of arcs whose centers of curvature are located in a first center line passing through a first point of said principal axis perpendicular thereto and to said predetermined plane of deflection and having arcuate exit edges extending substantially transversely to said principal axis in the form of arcs whose centers of curvature are located in a second center line passing through said principal axis parallel to said first center line and at a second point of said principal axis located between said first point of said principal axis and said deflecting plates; and an image screen having a spherical face whose center of curvature is located on said principal axis farther from said image screen than said first point of said principal axis.

4. In a cathode ray tube in combination, means for emitting an electron beam along a principal axis; first electron beam deflecting means for deflecting said emitted electron beam, said deflecting means having a mid-deflection point located in said principal axis from which said electron beam is deflected in a predetermined plane of deflection; second electron beam deflecting means including a pair of deflecting plates located in direction of the principal axis after and spaced from said first electron beam deflecting means on opposite sides of said principal axis, said deflecting plates having arcuate entrance edges extending substantially transversely to said principal axis in the form of arcs whose centers of curvature are located in a first center line passing through said mid-deflection point perpendicular to said principal axis and to said predetermined plane of deflection and having arcuate exit edges extending substantially transversely to said principal axis in the form of arcs whose center of curvature are located in a second center line passing through said principal axis parallel to said first center line and at a point of said principal axis located between said mid-deflection point on said principal axis and said deflecting plates; and an image screen having a spherical face whose center of curvature is located on said principal axis farther from said image screen than said mid-deflection point of said first electron beam deflecting means.

5. In a cathode ray tube in combination means for emitting an electron beam along a principal axis; first electron beam deflecting means for deflecting said emitted electron beam, said deflecting means having a mid-deflection point located in said principal axis from which said electron beam is deflected in a predetermined plane of deflection; second electron beam deflecting means including a pair of deflecting plates located in direction of the principal axis after and spaced from said first electron beam deflecting means on opposite sides of said principal axis, said deflecting plates having entrance edges extending substantially transversely to said principal axis in the form of arcs whose centers of curvature are located in a first center line located perpendicular to said principal axis and to said predetermined plane of deflection and passing through said principal axis at a first point thereof located between said mid-deflection point and said deflecting plates, said deflecting plates having also exit edges extending substantially transversely to said principal axis in the form of arcs whose centers of curvature are located in a second center line passing through said principal axis parallel to said first center line and at a second point of said principal axis located between said first point of said principal axis and said deflecting plates; and an image screen having a curved face the radius of curvature of which at any point thereof is greater than the distance between said mid-deflection point and said image screen.

References Cited in the file of this patent

UNITED STATES PATENTS

| | | |
|---|---|---|
| 2,114,572 | Ressler | Apr. 19, 1938 |
| 2,126,286 | Schlesinger | Aug. 9, 1938 |
| 2,152,363 | Ruska | Mar. 28, 1939 |
| 2,163,256 | Du Mont | June 20, 1939 |
| 2,222,942 | George | Nov. 26, 1940 |
| 2,524,606 | Shelton | Oct. 3, 1950 |